United States Patent
Sternharz et al.

(10) Patent No.: US 12,466,584 B2
(45) Date of Patent: Nov. 11, 2025

(54) EJECTION UNIT

(71) Applicant: EXOLAUNCH GmbH, Berlin (DE)

(72) Inventors: Dmitriy Sternharz, Berlin (DE); Peter Schwarz, Salzburg (AT); Johannes Gruber, Salzburg (AT); Peter Wimmer, Pfarrwerfen (AT); Sergey Polyak, Berlin (DE); Denis Bederov, Berlin (DE)

(73) Assignee: EXOLAUNCH GmbH, Berlin (DE)

( * ) Notice: Subject to any disclaimer, the term of this patent is extended or adjusted under 35 U.S.C. 154(b) by 0 days.

(21) Appl. No.: 18/845,677

(22) PCT Filed: Mar. 9, 2023

(86) PCT No.: PCT/EP2023/056045
§ 371 (c)(1),
(2) Date: Sep. 10, 2024

(87) PCT Pub. No.: WO2023/170223
PCT Pub. Date: Sep. 14, 2023

(65) Prior Publication Data
US 2025/0206470 A1    Jun. 26, 2025

(30) Foreign Application Priority Data

Mar. 10, 2022   (EP) ..................... 22161287

(51) Int. Cl.
*B64G 1/64* (2006.01)
(52) U.S. Cl.
CPC ..................... *B64G 1/642* (2023.08)

(58) Field of Classification Search
CPC ...... B64G 1/642; B64G 1/643; B64G 1/2228; B64G 1/64; B64G 1/10; B64G 1/644
See application file for complete search history.

(56) References Cited

U.S. PATENT DOCUMENTS

| | | | | |
|---|---|---|---|---|
| 5,848,766 | A | * | 12/1998 | Thompson ............... B64G 1/60 244/173.1 |
| 9,434,486 | B1 | | 9/2016 | Santos et al. |
| 9,845,166 | B2 | * | 12/2017 | London ............... B64G 1/4022 |
| 10,569,910 | B2 | * | 2/2020 | Bogdanov ............. B64G 1/643 |
| 11,208,218 | B2 | * | 12/2021 | Lim ..................... B64G 1/6425 |
| 11,794,928 | B2 | * | 10/2023 | Beck ..................... F16C 29/005 |
| 2014/0131521 | A1 | * | 5/2014 | Apland ................. B64G 1/641 244/173.3 |
| 2014/0319283 | A1 | * | 10/2014 | Holemans ............. B64G 1/642 244/173.3 |
| 2016/0031572 | A1 | | 2/2016 | Dube et al. |
| 2018/0194494 | A1 | * | 7/2018 | Dube ..................... B64G 1/643 |
| 2020/0010220 | A1 | * | 1/2020 | Fraze ..................... B33Y 10/00 |

FOREIGN PATENT DOCUMENTS

| | | |
|---|---|---|
| CN | 106081170 A | 11/2016 |
| CN | 109229433 A | 1/2019 |
| DE | 102016108606 A1 | 11/2017 |
| KR | 102134620 B1 | 7/2020 |

* cited by examiner

*Primary Examiner* — Joshua D Huson
*Assistant Examiner* — Vicente Rodriguez
(74) *Attorney, Agent, or Firm* — Vivacqua Crane, PLLC

(57) ABSTRACT

An ejection unit for a satellite comprises a housing which is closed by a door and in which a guide for the satellite is provided. The guide comprises angled rails and a clamping apparatus to fixedly clamp the satellite by means of a clamping mechanism.

16 Claims, 7 Drawing Sheets

EJECTION UNIT

CROSS-REFERENCE TO RELATED APPLICATIONS

This application is a national stage application under 35 U.S.C. 371 of PCT Application No. PCT/EP2023/056045 having an international filing date of Mar. 9, 2023, which claims the benefit of EPO patent application Ser. No. 22/161, 287.2, filed Mar. 10, 2022, the entire disclosure of each of which are hereby incorporated herein by reference.

INTRODUCTION

The present invention relates to an ejection unit for at least one cuboid satellite, in particular for at least one picosatellite, comprising a housing which is closed by at least one door and in which a guide for receiving a satellite is provided. The guide has four parallel angled rails whose two legs are each arranged at two (adjoining) surfaces of an (imaginary) cuboid, wherein a clamping apparatus is provided that releasably clamps a satellite in the guide.

Such an ejection unit is known from DE 10 2016 108 606 A1. The outer dimensions of the imaginary cuboid, which is bounded by the angled rails, correspond to the outer dimensions of the satellite so that the latter can be inserted between the angled rails. The satellites can be satellites according to the CubeSat standard. They are usually transported by a rocket into an orbit and are ejected there by the ejection unit. For the ejection, the door of the ejection unit is opened and the satellite or satellites are pushed out of the guide and are thereby released. However, during transport into the orbit, the satellite and the ejection unit are exposed to high accelerations and loads, in particular on the launch of the rocket and on the separation of rocket parts, such as a larger main satellite.

It is therefore the object of the present invention to further develop an ejection unit according to the preamble of claim 1 such that a secure and vibration-free fixation of a satellite in the ejection unit is ensured with a simplified design.

This object is satisfied by the features of claim 1 and in particular in that the clamping apparatus has at least one clamping mechanism that applies a force to an angled rail exclusively in a direction that forms a bisecting line of this angled rail.

SUMMARY

According to the invention, a satellite is not clamped at individual discrete positions, but via an angled rail that is part of the guide so that the clamping force that is applied to the satellite is uniformly distributed over the satellite. Furthermore, the application of the clamping force to the satellite does not take place from two adjacent sides, but diagonally, whereby extraordinarily high clamping and damping forces can be achieved with just one clamping mechanism, considering the available installation space conditions and component dimensions. The design is hereby also considerably simplified.

Advantageous embodiments of the invention are described in the description, in the drawing and in the dependent claims.

According to a first advantageous embodiment, one of the angled rails can have a leg that is outwardly spaced apart from the adjacent surface of the (imaginary) cuboid. In this embodiment, one of the angled rails thus contacts a satellite with only one leg, wherein the other leg of the angled rail is spaced apart from the adjacent side wall of the satellite. It is hereby achieved that, with the associated clamping apparatus that exerts a force in a diagonal direction, a clamping force is only transmitted perpendicular to a surface of the satellite. By using two clamping mechanisms of the above-described kind, i.e. with a force application diagonally, on the one hand, and perpendicular to the satellite, on the other hand, even larger satellites (e.g. of the size 6 U) can be reliably held and damped without the forces of the clamping mechanisms working against one another.

If only one clamping mechanism is provided at an angled rail, it can be advantageous if the three remaining angled rails are fastened to the housing in a stationary manner. If two angled rails are provided with clamping mechanisms, it can be advantageous if the other two angled rails are fastened to the housing in a stationary manner.

According to a further advantageous embodiment, the at least one clamping mechanism can have a carriage supported on rollers, said carriage supporting a displaceable slot rail that is in turn supported on rollers of the carriage. Such a design, which can advantageously have an inclined slot guide, allows the forces for clamping the satellite to be deflected, on the one hand, and multiplied, on the other hand, to achieve an improved damping. In this respect, the carriage has two roller systems, namely one roller system for a low-friction movement of the carriage and a second roller system for moving the displaceable slot rail.

According to a further advantageous embodiment, a spring-loaded conical bolt can be provided and secures an ejection carriage of the ejection unit in a blocking position when the ejection carriage is in a preloaded position. Due to a spring-loaded bolt formed as a cone at its front end, said bolt can, when the ejection carriage is clamped, automatically slide into a blocking position in that the cone of the bolt engages into an opening of the ejection carriage. To prevent the conical bolt from being pushed out of its blocking position again by the preloaded ejection carriage, according to a further advantageous embodiment, a locking pin can be provided that holds the conical bolt in its blocking position as long as the door is not almost fully open. It is hereby achieved that the locking pin behind the conical bolt is only released when the door is fully or almost fully opened so that the conical bolt moves out of its blocking position and releases the ejection carriage so that the latter can be moved in the ejection direction by the force of a spring to eject a satellite.

According to a further advantageous embodiment, the at least one clamping mechanism can have a push plunger abutting the door and can furthermore have a pull plunger which can be actuated by the door and which is acted on by force, for example, via a push rod that is connected to the door in an articulated manner. In this way, the clamping mechanism is tensioned by two independently operating mechanisms. When the door closes, it presses on the push plunger to activate the clamping mechanism. At the same time, the pull plunger can apply a pulling force to the clamping mechanism when the door is being closed.

In the above-described embodiment, it can be advantageous if, at the end of the opening movement of the door, the locking pin serves as an entrainer for the pull plunger since a redundant mechanism is hereby provided to move the carriage in the opening direction.

According to a further advantageous embodiment, the ejection unit can have at least one rigid screw bolt that fixes an ejection carriage in a preloaded position at the housing. The loading of the satellite can hereby be facilitated and an unintentional moving forward of the clamped ejection carriage can be prevented. The screw bolt can here be screwed into the ejection carriage from the outside through the housing, whereby it is simultaneously ensured that the carriage is located at its rear stop so that play between the ejection carriage and the housing is eliminated. Furthermore, such a screw bolt serves to prevent unwanted movements and unnecessary system loads before the use in space.

According to a further advantageous embodiment, at least one fixing pin can be screwed into the door from the outside and fixes a satellite without play in the ejection direction, said satellite being arranged in the guide. When a satellite has been inserted into the guide of the ejection unit and the door has been closed, the ejection carriage can be fixed to the housing in its preloaded position as described above. If the fixing pin is then screwed in from the front side of the door, any play between the satellite and the housing can be eliminated. According to a further advantageous embodiment, for the fixing pin, a plate-like security against rotation can here be provided through which the fixing pin is screwed, on the one hand, and which is secured to the outer side of the door with a screw, on the other hand. When the screw is loosened, the security against rotation can still move slightly so that the fixing pin can be screwed into the door. However, if the screw is then tightened, the security against rotation tilts slightly so that a loosening of the fixing pin is no longer possible due to frictional locking in one thread turn of the fixing pin.

According to a further advantageous embodiment, an emergency release device can be provided at the outer side of the door to open the door manually and/or without power during testing or servicing work.

According to a further advantageous embodiment, a door locking device that can be operated without tools can be provided at the outer side of the door to lock the door. It can be advantageous here if the door locking device can be operated with just one hand.

According to a further advantageous embodiment, the housing can be provided with service windows that are each closed with a plate that is inserted at one side into a retaining groove and that is releasably fixed at another side to a clamping element that is captively fastened to the housing. In this way, a quick release and fastening of the plate is possible since it only needs to be inserted into its retaining groove and fixed to the housing with the clamping element. The clamping element can, for example, be a nut that can be screwed onto a threaded pin, wherein the threaded pin can be provided with an end piece at its outer end, said end piece preventing the nut from loosening completely.

BRIEF DESCRIPTION OF THE DRAWINGS

The present invention will be described in the following purely by way of example with reference to advantageous embodiments and to the enclosed drawings. There are shown.

DETAILED DESCRIPTION

Figure 1:
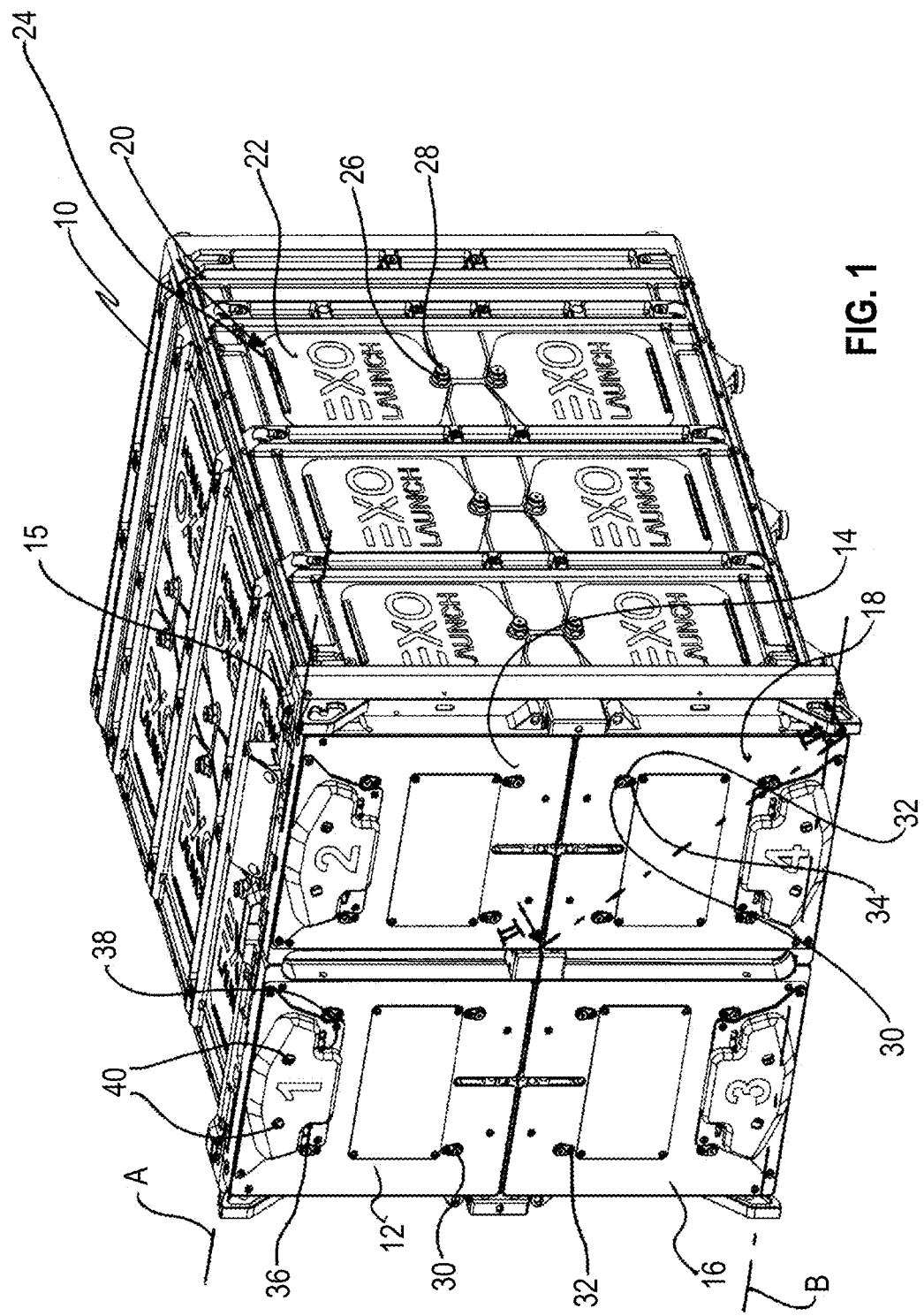
FIG. 1 a perspective view of an ejection unit.

FIG. 1 shows a perspective view of an exemplary embodiment of an ejection unit for a total of four cuboid satellites. The ejection unit comprises a likewise cuboid housing 10 in which a total of four ejection shafts are provided for one satellite each and are marked with the numbers 1 to 4. Each ejection chute is closed by a door 12, 14, 16 and 18, wherein the doors 12 and 14 are pivotable about an axis A and the doors 16 and 18 are pivotable about an axis B to enable an ejection of a satellite. Each door is locked by a locking unit, not shown in detail, that can be unlocked by remote control.

As FIG. 1 further illustrates, the housing is provided with a plurality of service windows 20 that are each closed with a plate 22. Each plate is inserted at one side into a retaining groove 24 formed at the housing and is releasably fixed at its oppositely disposed side to a clamping element 26 that is captively fastened to the housing 10. In the embodiment example shown, the clamping element is a nut that is screwed onto a threaded pin that is provided with a cap 28 at its upper side to prevent the nut from loosening. Each plate 22 is flexible and has, in the region of the clamping element, a recess that is outwardly open at one side so that, after the insertion into the retaining groove 24, each plate 22 can be plugged under the nut 26 and can then be screwed.

It can furthermore be seen in FIG. 1 that two fixing pins 30 are screwed into each door from the outside, pass through the door and serve to fix a satellite in the ejection direction without play. Each fixing pin 30 is here screwed through a security against rotation that has the shape of a small plate 32, wherein the small plate 32 can be fixedly screwed to the outer side of the door with a screw 34. When the screw 34 is loosened, the fixing pin 30 can be screwed through the small plate 32 into the door. When the screw 34 is then tightened, the small plate 32 tilts within the thread of the fixing pin 30, whereby an unscrewing of the fixing pin from the door is prevented.

FIG. 1 further shows that a door locking device is provided at the outer side of each door and is formed by two pins 36 and 38 that can be pressed together without tools using the thumb and forefinger to lock each individual door. An emergency release device 40, which can be triggered using a tool, is also provided at the outer side of each door.

A contact element 15, whose two contact pins are short-circuited when the door is fully open, is provided at the front side of the housing 10 at each door. When the satellite is ejected, it can hereby be checked whether the door has opened fully. Magnetic switches that can detect a complete closing of each door can also be attached to the housing 10.

Figure 5:
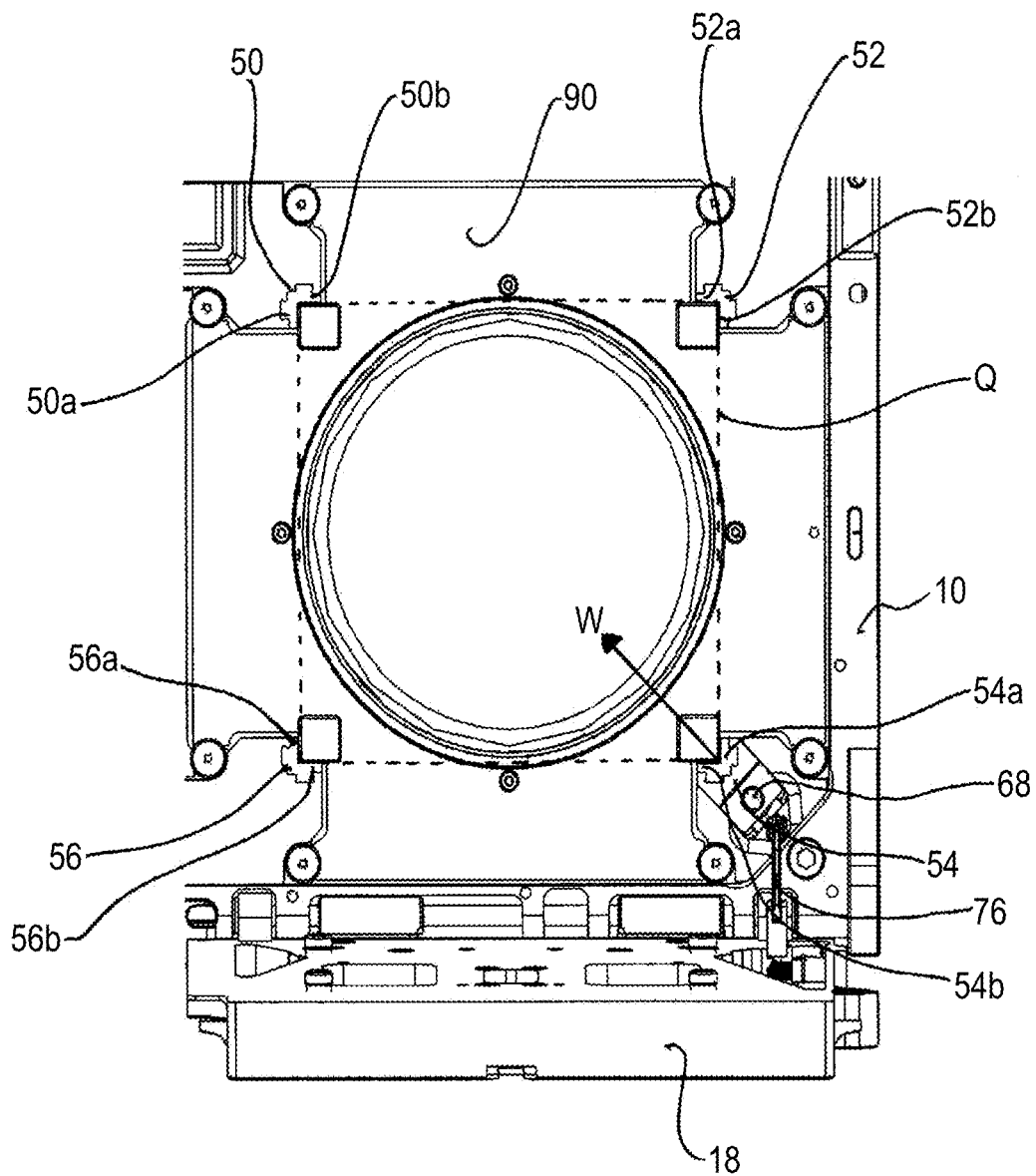
FIG. 5 a plan view of the bottom-right ejection chute of FIG. 1 with the door open.

FIG. 5 shows a plan view of a part of the ejection unit of FIG. 1, namely of the ejection chute 4 with the door 18 open. As can be seen, a four-sided guide of the satellite is provided in the housing 10 to receive each satellite and consists of a total of four angled rails 50, 52, 54 and 56 that are arranged in parallel with one another, wherein a respective two legs 50a, 50b, 52a, 52b, 54a, 54b and 56a, 56b are arranged at two adjacent surfaces of an (imaginary) cuboid Q shown dashed in FIG. 5. This imaginary cuboid Q corresponds to the outer dimensions of a satellite to be ejected and also extends over the length of the satellite into the drawing plane. Thus, a satellite inserted into the guide formed by the angled rails 50 to 56 is guided and held at each outer side by two legs of the guide rails.

To releasably clamp the satellite in the guide, in the embodiment example shown, the angled rail 54 is provided with a clamping apparatus described in more detail below. The clamping apparatus has a clamping mechanism that applies a force to the angled rail 54 exclusively in a direction W that forms a bisecting line of this angled rail. The force is therefore only applied diagonally to the satellite. Since the three remaining angled rails 50, 52 and 56 are fastened to the housing 10 in a stationary manner, a satellite can be securely clamped and held in the housing 10 by applying force to the angled rail 54 in the direction of the bisecting line W.

Figure 2:
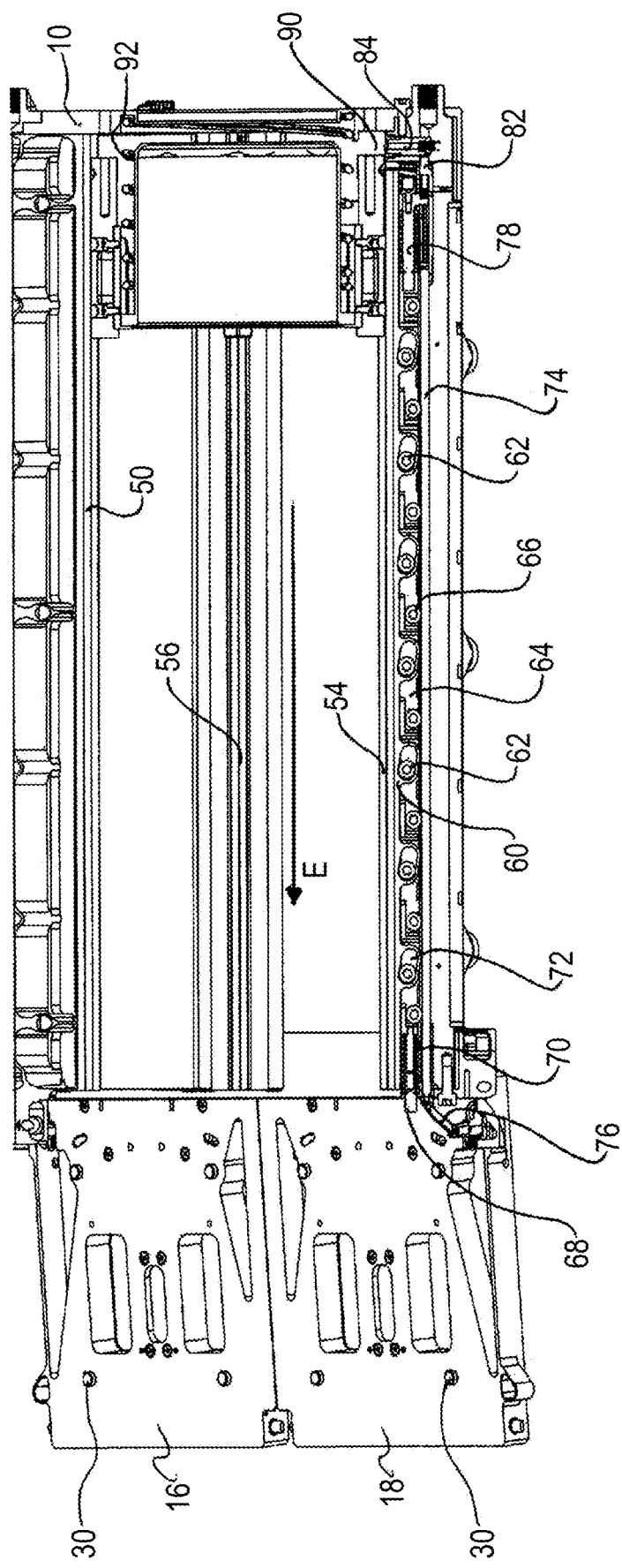
FIG. 2 a longitudinal section along the line II-II of FIG. 1 with the doors open.
Figure 3:
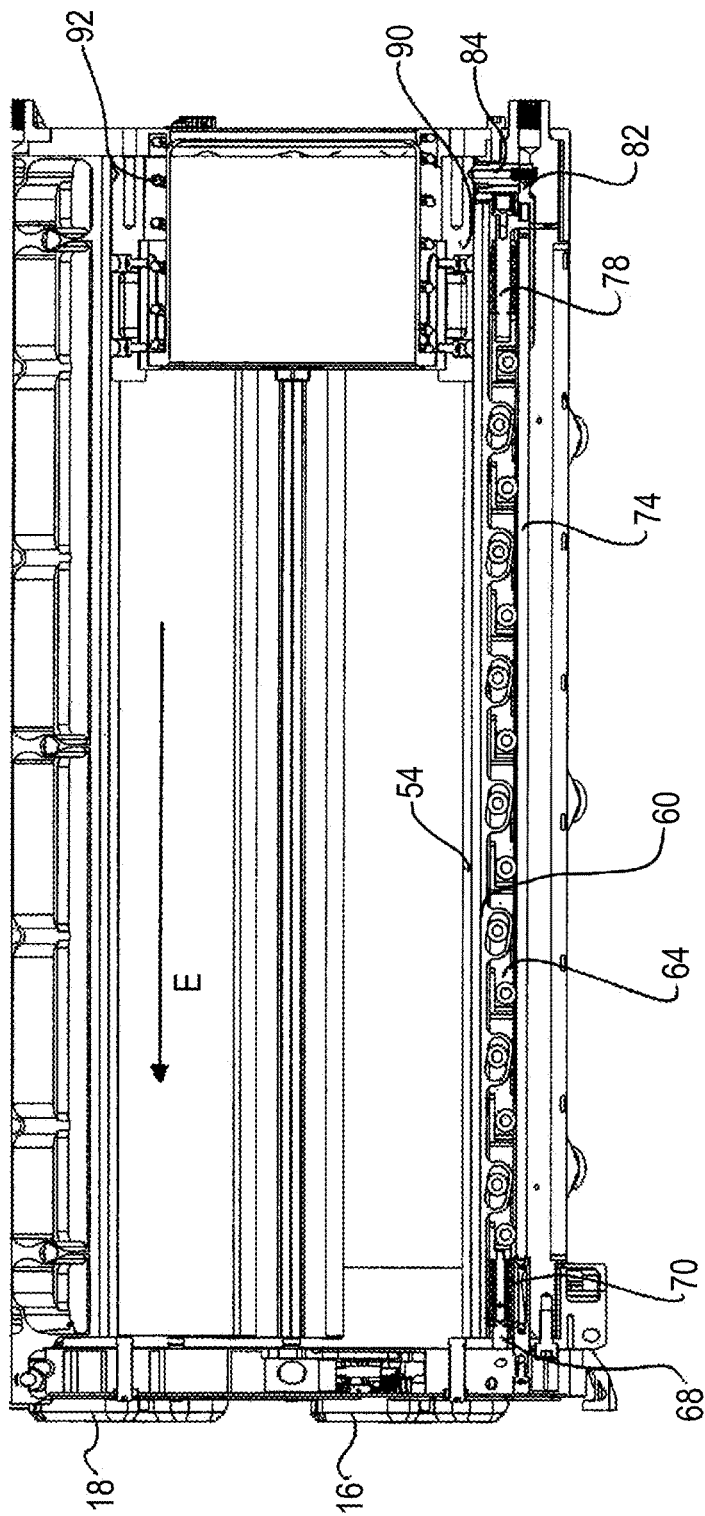
FIG. 3 a longitudinal section corresponding to FIG. 2 with the doors closed.

FIG. 2 and FIG. 3 show a section along the line II-II of FIG. 1 with the doors open (FIG. 2) and closed (FIG. 3), respectively. As shown in FIG. 2 in this respect, the angled rail 54 is fastened to a displaceable slot rail 60 that is supported on rollers 62 of a carriage 64 that is again supported on rollers 66 and can be moved in the ejection direction E. A push plunger 68 serves to displace the carriage 64 against the ejection direction E and, when the door 18 closes, abuts the rear side of the door and moves the carriage 64 against the force of a spring 70 against the ejection direction E. By moving the carriage 64 against the ejection direction E, the rollers 62 move within their slot guides 72 that extend obliquely with respect to the ejection direction E and have a pitch of six to one in the embodiment example shown. If the carriage 64 is thus moved by six units, this causes a movement of the slot rail 60, and thus also the angle profile 54, by one unit. Conversely, a force acting on the angled rail 54 (due to vibrations of the satellite) is reduced by a factor of six, whereby even severe vibrations can be well damped.

A further component of the clamping mechanism for the angled rail 54 is a push rod 74 that is connected at its front end to the door 18 via a joint 76 and is connected at its rear end to a pull plunger 78 that pulls the carriage 64 to the rear against the force of a spring 80 against the ejection direction E. A locking pin 82 is connected to the pull plunger 78 and can be pushed behind a spring-loaded conical bolt 84 that serves to secure an ejection carriage 90, as described in more detail below.

Figure 4:
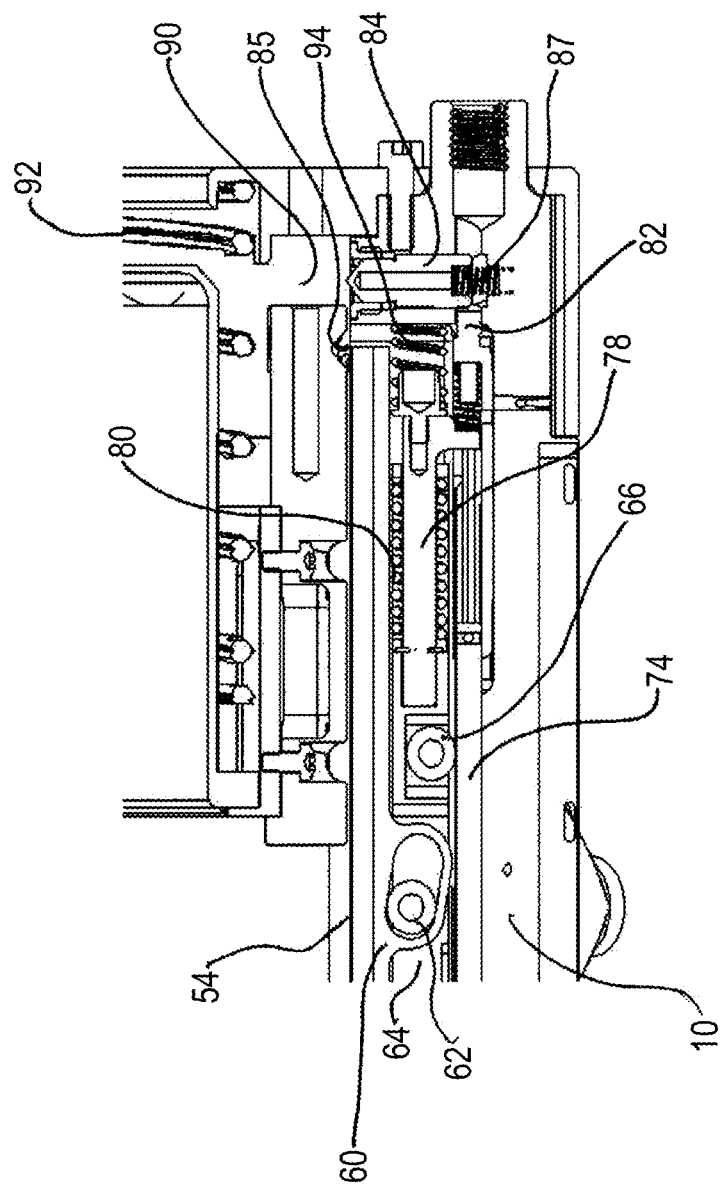
FIG. 4 an enlarged representation of the bottom-right region of FIG. 3.

As FIG. 5 shows, the ejection carriage 90 runs on all four angled rails 50 to 56, wherein an ejection of the satellite can be effected by an ejection spring 92. To hold the ejection carriage 90 in its preloaded rear position (FIGS. 2 to 4), the conical bolt 84, which is provided with a cone at its front side, engages into a corresponding recess 85 in the ejection carriage 90. FIG. 4 here shows a position of the ejection carriage 90 in which the latter has not yet been moved completely into its rear end position (cf. also FIG. 2). However, if this is the case (FIG. 3), the conical bolt 84 secures the ejection carriage 90 in the blocking position of the conical bolt 84 in that the latter is pressed by its spring 87 into the recess 85 of the ejection carriage 90. Due to the conical shape of the conical bolt 84, the ejection carriage 90 can first slide over the conical bolt 84 until the latter engages into the recess 85. To prevent the conical bolt 84 from being released from its blocking position, the conical bolt 84 is blocked at its rear end by the locking pin 82 as long as the door 18 is not fully or almost fully open. Only when the door 18 has reached its open position, has the push rod 74 moved far enough in the ejection direction E to release the conical bolt 84 at its rear side. At this moment, the force of the ejection spring 92 causes a movement of the ejection carriage 90 in the ejection direction E so that a satellite located on the angled rails can be ejected. During this movement, the locking pin 82 also serves as an entrainer for the pull plunger 78, i.e. the locking pin 82 presses on the pull plunger 78 from behind so that the latter is forcibly moved in the ejection direction E if the force of a compression spring 94 (FIG. 4) is not sufficient to move the carriage 64 in the ejection direction E.

To load a satellite in an ejection chute of the above-described ejection unit, the ejection carriage 90 is first moved against the ejection direction E up to the rear end of the ejection chute so that the ejection spring 92 is compressed. In this position, the ejection carriage can then first be fixed to the housing 10 in the preloaded position using spring-loaded screw bolts by the ejection carriage 90 sliding over the spring-loaded screw bolt until the latter engages into a fixing opening. It is hereby is no longer necessary in the following to manually hold the ejection carriage 90 in its preloaded position.

One or more screw bolts can then be screwed from the rear side of the housing 10 through the housing into the ejection carriage 90 to fix the ejection carriage 90 in its rearmost position, whereby a transport securing device is simultaneously provided. The satellite can then be inserted into the ejection chute, wherein it can be pushed into each angled rail 50 to 56 with its four outer edges. When the door 18 is then closed, it presses with its inner side against the push plunger 68 and against the force of the spring 70, whereby the carriage 64 is moved to the rear against the ejection direction E, which in turn moves the slot rail 60 in the direction W due to the oblique slot guides (FIG. 5). At the same time, the push rod 74 is pushed to the rear via the joint 76, whereby the carriage 64 is pushed to the rear against the force of the spring 80 until the locking pin 82 engages behind the conical bolt 84. The ejection carriage 90 is hereby locked so that an ejection of the satellite is possible after removing the rigid screw bolts and the spring-loaded screw bolts. In this state, the satellite is pressed against the angled rails 50, 52 and 56 by the force of the springs 70 and 80 by the angled rail 54. If the satellite exerts a force, due to the occurring acceleration, on the angled rail 54 and thus also on the slot rail 60 after the launch of the rocket, this force is deflected via the 6:1 pitch to the carriage 64 that covers six times as much distance as the slot rail 60. The movement of the carriage 64 is damped by the two springs 70 and 80 in the process. If they have a maximum force of, for example, 200 N, this means that the damping system damps the satellite with 2400 N.

If the satellite is to be ejected into space, the door is unlocked by remote control so that it opens via springs, not shown in more detail. The push plunger 68 is hereby released again and the push rod 74 begins to move forward in the ejection direction E when the door is opened, whereby the push plunger 78 is also moved in the ejection direction E. As soon as the two springs 70 and 80 no longer exert any force on the carriage 64, the latter is pushed forwards in the ejection direction E by the compression spring 94 and this movement causes a retraction of the slot rail 60 via the oblique slot guides 72, whereby the satellite is no longer clamped in its guide. In the last opening angle degrees of the door 18, the locking pin 82 is forcibly pulled out by the push rod 74 behind the conical bolt 84 so that the latter can be pushed away from the ejection carriage 90, whereby the ejection carriage 90 is moved by the ejection spring 92 in the ejection direction E so that the satellite is ejected.

Figure 6:
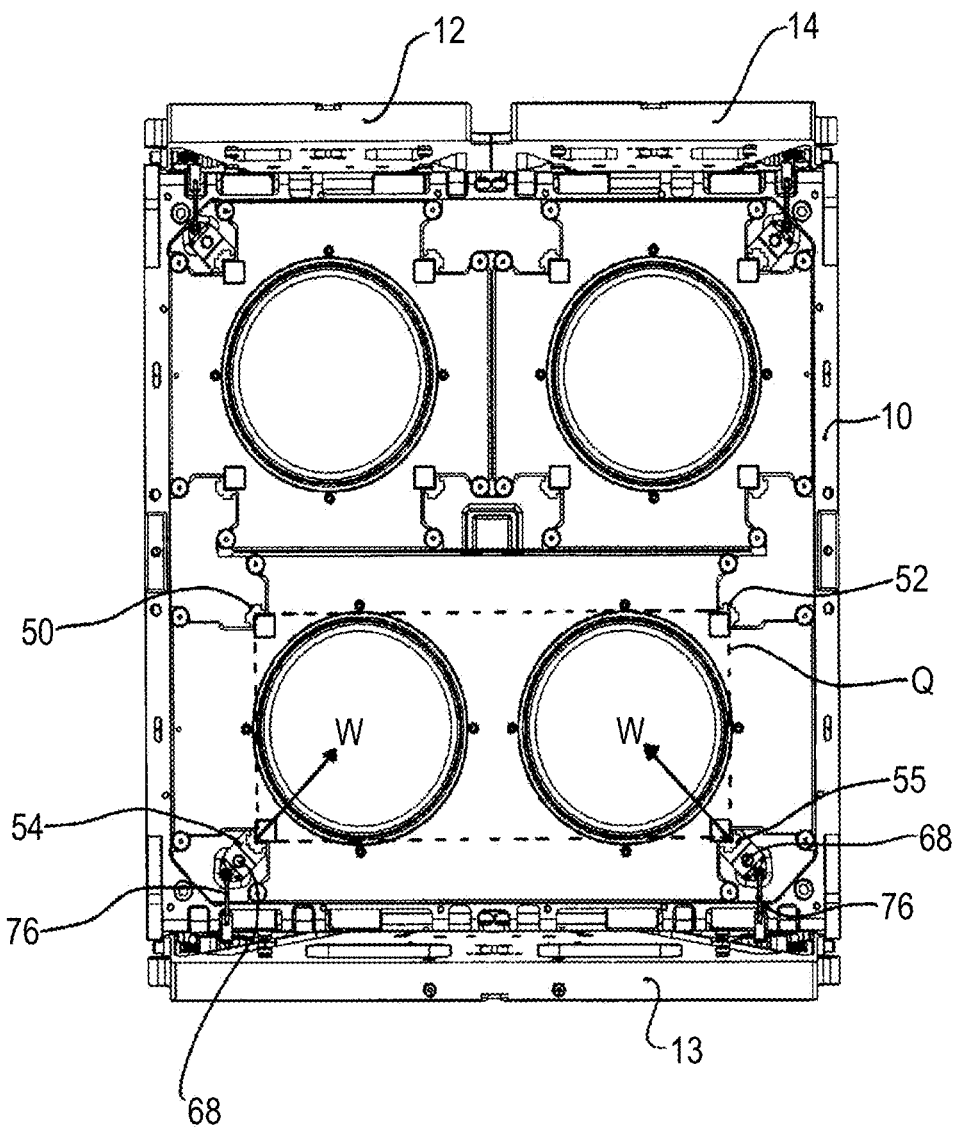
FIG. 6 a plan view of an ejection unit according to a further embodiment with the doors open.
Figure 7:
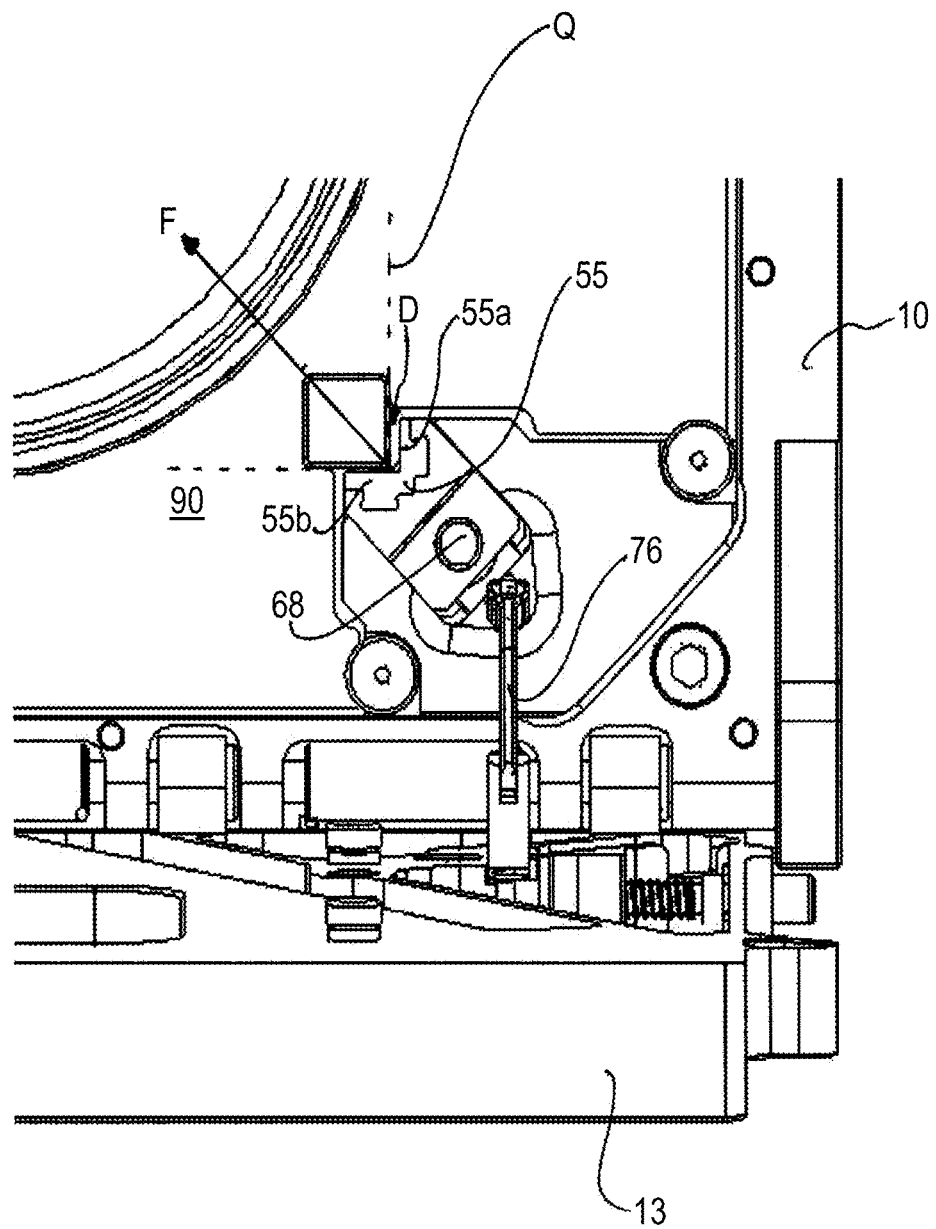
FIG. 7 an enlarged representation of the bottom-right region of FIG. 6.

FIG. 6 and FIG. 7 show a further embodiment of an ejection unit, wherein the same components are provided with the same reference signs and only the differences are explained. In the ejection unit shown in FIG. 6, a total of three ejection chutes are provided that can be closed by doors 12, 13 and 14, wherein the lower ejection chute, which can be closed by the door 13, has twice the volume of an upper ejection chute. The two upper ejection chutes with the doors 12 and 14 are designed as in the above-described embodiment example. The lower ejection chute with the door 13 in turn has two fixed-position angled rails 50 and 52 and an angled rail 54 that is provided with a clamping mechanism of the above-described kind. The fourth angled rail 55, which is located at the same lower side of the cuboid Q as the angled rail 54, is likewise provided with a clamping mechanism of the above-described kind. However, the design of the angled rail 55 differs from that of the angled rail 54, which is explained in more detail with reference to FIG. 7.

As FIG. 7 shows, the angled rail 55 also has two legs 55*a* and 55*b* extending at right angles to one another, wherein the leg 55*b* (the horizontal leg in the Figure) is in turn arranged at the lower surface of the cuboid Q. However, the other leg 55*a* (the vertical leg in the Figure) of the angled rail 55 is outwardly spaced apart from its adjacent surfaces of the cuboid Q by a spacing D. The angled rail 55 hereby does not rest with its leg 55*a* against a satellite that fills the space of the cuboid Q. The clamping mechanism of the angled rail 55 thus exerts a force F that runs parallel to the bisecting line of the angled rail 55. However, this force F only acts in the vertical direction on a satellite inserted into the ejection chute since the leg 55*a* is spaced apart from the cuboid Q by the spacing D and thus does not contact the satellite either. In this way, it is achieved that a satellite can be strongly damped and easily held in the ejection chute due to the two clamping mechanisms at the angled rails 54 and 55, but without the two clamping mechanisms working against one another.

The invention claimed is:

1. An ejection unit for at least one cuboid satellite, said ejection unit comprising a housing which is closed by at least one door and in which a guide for receiving the at least one cuboid satellite is provided, said guide comprising four parallel angled rails, each of the four parallel angled rails having a first leg and a second leg oriented at ninety degrees to the first leg, wherein the first leg and the second leg are arranged at two surfaces of a cuboid, and a clamping apparatus that releasably clamps the at least one cuboid satellite in the guide, wherein the clamping apparatus has at least one clamping mechanism that applies a force to one of the four parallel angled rails, wherein the force is applied exclusively in a direction which is forty five degrees from both the first leg and the second leg of the one of the four parallel angled rails thus forming a bisecting line of the one of the four parallel angled rails.

2. The ejection unit according to claim 1, wherein one of the four parallel angled rails has a leg that is outwardly spaced apart from one of the two surfaces of the cuboid by a spacing.

3. The ejection unit according to claim 1, wherein two or three of the four parallel angled rails are stationarily fastened to the housing.

4. The ejection unit according to claim 1, wherein a spring-loaded conical bolt is provided and secures an ejection carriage in a blocking position when said ejection carriage is in a preloaded position.

5. The ejection unit according to claim 4, wherein the spring-loaded conical bolt is held in the blocking position by a locking pin as long as the door is not fully open.

6. The ejection unit according to claim 1, wherein the at least one clamping mechanism has a push plunger abutting the door and a pull plunger which is actuatable by the door.

7. The ejection unit according to claim 1, wherein at least one rigid screw bolt is provided that fixes an ejection carriage in a preloaded position at the housing.

8. The ejection unit according to claim 1, wherein at least one spring-loaded screw bolt is provided that fixes an ejection carriage in a preloaded position at the housing.

9. The ejection unit according to claim 1, wherein at least one fixing pin is screwed into the door from an outer side and fixes the at least one cuboid satellite without play in an ejection direction, the at least one cuboid satellite being arranged in the guide.

10. The ejection unit according to claim 9, wherein the fixing pin is screwed through a plate that is secured at the outer side of the door with a screw, wherein the plate is configured to prevent rotation of the fixing pin when the screw is tightened.

11. The ejection unit according to claim 1, wherein an emergency release device is provided at an outer side of the door.

12. The ejection unit according to claim 1, wherein a door locking device that is operable without tools is provided at an outer side of the door.

13. The ejection unit according to claim 1, wherein the housing is provided with service windows that are closed with a plate that is inserted at one side into a retaining groove and that is releasably fixed at another side to a clamping element that is captively fastened to the housing.

14. An ejection unit for at least one cuboid satellite, said ejection unit comprising a housing which is closed by at least one door and in which a guide for receiving the at least one cuboid satellite is provided, said guide comprising four parallel angled rails whose two legs are each arranged at two surfaces of a cuboid, and a clamping apparatus that releasably clamps the at least one cuboid satellite in the guide, wherein the clamping apparatus has at least one clamping mechanism that applies a force to one of the four parallel angled rails exclusively in a direction that forms a bisecting line of the one of the four parallel angled rails, wherein the at least one clamping mechanism has a carriage supported on rollers, said carriage supporting a displaceable slot rail that is supported on rollers of the carriage.

15. An ejection unit for at least one cuboid satellite, said ejection unit comprising a housing which is closed by at least one door and in which a guide for receiving the at least one cuboid satellite is provided, said guide comprising four parallel angled rails whose two legs are each arranged at two surfaces of a cuboid, and a clamping apparatus that releasably clamps the at least one cuboid satellite in the guide, wherein the clamping apparatus has at least one clamping mechanism that applies a force to one of the four parallel angled rails exclusively in a direction that forms a bisecting line of the one of the four parallel angled rails, wherein the at least one clamping mechanism has a push plunger abutting the door and a pull plunger which is actuatable by the door, and wherein a spring-loaded conical bolt is held in a blocking position by a locking pin as long as the door is not fully open and, wherein at an end of an opening movement of the door, the locking pin serves as an entrainer for the pull plunger.

16. An ejection unit for at least one cuboid satellite, said ejection unit comprising a housing which is closed by at least one door and in which a guide for receiving the at least one cuboid satellite is provided, said guide comprising four parallel angled rails whose two legs are each arranged at two surfaces of a cuboid, and a clamping apparatus that releasably clamps the at least one cuboid satellite in the guide, wherein the clamping apparatus has at least one clamping mechanism that applies a force to one of the four parallel angled rails exclusively in a direction that forms a bisecting line of the one of the four parallel angled rails, wherein the at least one clamping mechanism has a push plunger abutting the door and a pull plunger which is actuatable by the door, and wherein the pull plunger is actuated via a push rod having an articulated connection with the door.

\* \* \* \* \*